United States Patent [19]

Jones et al.

[11] Patent Number: 4,569,969
[45] Date of Patent: Feb. 11, 1986

[54] POLYBLENDS OF STYRENE-MALEIC ANHYDRIDE-METHYL METHYLACRYLATE TERPOLYMERS/ACRYLONITRILE-BUTADIENE-STYRENE POLYMERS AND POLYCARBONATES

[75] Inventors: William J. Jones, Holyoke; Robert A. Mendelson, South Hadley, both of Mass.

[73] Assignee: Monsanto Company, St. Louis, Mo.

[21] Appl. No.: 680,582

[22] Filed: Dec. 10, 1984

Related U.S. Application Data

[63] Continuation of Ser. No. 524,944, Aug. 22, 1983, abandoned.

[51] Int. Cl.4 ............... C08L 55/02; C08L 69/00
[52] U.S. Cl. .................................... 525/67; 525/74; 525/148
[58] Field of Search ................................ 525/67

[56] References Cited

U.S. PATENT DOCUMENTS 3,336,267  8/1967  Zimmerman et al. ............ 525/74
4,172,103 10/1979  Serini et al. ...................... 525/76
4,197,376  4/1980  Lee et al. .......................... 525/74

FOREIGN PATENT DOCUMENTS 51-122157 10/1976 Japan.

Primary Examiner—Jacob Ziegler
Attorney, Agent, or Firm—Linda L. Lewis; R. Bruce Blance; William J. Farrington

[57] ABSTRACT

Molding compositions are prepared from blends of (A) a styrene-maleic anhydride-methyl methacrylate terpolymer; (B) an ABS or MBS polymer; and (C) a polycarbonate. Component A, the styrene-maleic anhydride-methyl methacrylate terpolymers may optionally contain a rubber component.

10 Claims, No Drawings

POLYBLENDS OF STYRENE-MALEIC ANHYDRIDE-METHYL METHYLACRYLATE TERPOLYMERS/ACRYLONITRILE-BUTADIENE-STYRENE POLYMERS AND POLYCARBONATES

This is a continuation, of application Ser. No. 524,944, filed Aug. 22, 1983 now abandoned.

BACKGROUND OF THE INVENTION

This invention relates to polyblends and specifically to polyblends of styrene-maleic anhydridemethyl methacrylate (SMAMMA) terpolymers, acrylonitrile-butadiene-styrene (ABS) polymers and polycarbonates (PC) with the methyl methacrylate termonomers conferring improved impact properties on the styrene maleic anhydride (SMA) polymers and blends thereof with ABS and PC.

SMA polymers of the type described herein and blends of the SMA polymers with ABS polymers and PC are useful as molding and extrusion compounds. Certain end-use applications require impact strengths above those obtained with SMA polymers and blends thereof with ABS and PC. Examples of such applications include the dashboard and instrument panels in automobiles, appliance housings and smaller molded parts for various uses. Other properties of the molded objects, such as Vicat softening temperature and tensile strength, should be maintained within useful ranges.

The present invention provides a means of improving the impact properties of SMA polymers and blends thereof with ABS and PC by using methyl methacrylate termonomer in the SMA polymer while maintaining other physical properties within useful ranges.

DESCRIPTION OF THE PRIOR ART

Polyblends of SMA and ABS type polymers are described in U.S. Pat. Nos. 4,197,376 and 4,305,869. Polyblends of SMA, ABS and PC are described in U.S. Pat. Nos. 4,218,544 and 4,367,310. Polyblends of SMA-acrylonitrile, ABS and PC are described in 4,205,140.

SUMMARY OF THE INVENTION

The present invention provides a polyblend comprising:

A. from 5 to 70% by weight of a polymer of a vinylaromatic monomer (e.g. styrene) and an unsaturated dicarboxylic acid anhydride monomer (e.g. maleic anhydride) and a termonomer selected from the group consisting of $C_1$ to $C_3$ acrylates and methacrylates wherein the relative amounts by weight of the monomers in the polymer are 50 to 84% of the vinylaromatic monomer, 15 to 35% of the dicarboxylic acid anhydride and 1 to 25% of the termonomer; and wherein the monomers are polymerized in the presence of 0 to 25% by weight of a rubber having a glass transition temperature below 0° C.; and B. from 5 to 70% by weight of a grafted composition comprising a graft polymer of from 20 to 40 parts by weight of a monomer selected from the group consisting of methyl methacrylate and acrylonitrile and 80 to 60 parts by weight of a vinyl aromatic monomer the polymer being grafted onto a substrate rubber having a glass transition temperature below 0° C. wherein the monomers are polymerized in the presence of and grafted onto the substrate rubber, wherein the weight percent of the rubber is in the range from 5 to 60% by weight based on the weight of the composition;

C. from 5 to 70% of polycarbonate; and wherein the weight percent for Components A, B, and C is based on the total amount of Components (A), (B), and (C) in the polyblend.

Component A of the above formulation is preferably a styrene-maleic anhydride methyl methacrylate terpolymer. The styrene may be replaced in whole or in part by other vinylaromatic monomers, such as alphamethyl styrene, chloro-styrene, bromostyrene, p-methyl styrene and vinyl toluene. Similarly the maleic anhydride can be replaced in whole or in part by another unsaturated dicarboxylic anhydride such as itaconic, aconitic or citraconic anhydride. Similarly, the methyl methacrylate can be replaced in whole or in part by other $C_1$ to $C_3$ alkyl acrylates.

The proportions of the monomers in Component A preferably employed provide an anhydride content of from 15 to 30% by weight and a methyl methacrylate content of 5 to 25% by weight with the balance being styrene.

Component B is typically an ABS or methyl methacrylate-butadiene-styrene (MBS) type polymer, that is to say a diene rubber substrate grafted with styrene and either acrylonitrile, methyl methacrylate, methyl acrylate or a mixture of these monomers. However the rubber need not be the conventional polybutadiene or butadiene/styrene copolymer since any rubber with a glass transition temperature below 0° C. can be used. Such rubbers include EPDM rubber, polypentenamer, polyisoprene, polychloroprene, polyacrylate rubbers and the like. The styrene may be replaced in whole or in part by other styrenic monomer such as described with reference to Component A above. The acrylonitrile may be replaced in whole or in part by methacrylonitrile.

Component C is a polycarbonate resin which is suitable for injection molding or extrusion. Such polycarbonates are well known in the art and are commercially available. A variety of such polycarbonates or polycarbonate blends are disclosed in the following U.S. Pat. Nos. 3,649,712, 3,239,582, 3,742,088, 3,036,036 and 3,028,365; the teachings of which are incorporated by reference.

In addition to the above components the polyblends of the invention can advantageously contain other additives such as plasticizers, antioxidants, stabilizers, flame-retardants, fibers, mineral fibers, dyes, pigments and the like.

The components of the polyblend can be blended together by any convenient process. Usually however they are extrusion blended or compounded in a high intensity blender such as a Banbury Mixer. When using greater than about 30% by weight of Component A the use of extrusion blending is preferred.

Components A and B can be together provided by the formulations described in U.S. Pat. Nos. 4,305,869 and 4,197,376 and then blended with Component C.

The invention is now described with reference to the following examples which are for the purposes of illustration only and are not intended to imply any limitation on the scope of the invention. The components described below are blended in a number of different ratios and tested for various properties.

COMPONENTS USED

ABS-1—prepared by the graft emulsion polymerization of styrene and acrylonitrile in a weight ratio of 70:30 in the presence of polybutadiene rubber. ABS-1 contains 38% by weight of polybutadiene rubber. The polybutadiene rubber consists of 93% polybutadiene and 7% acrylonitrile copolymer. The weight average molecular weight of the free (ungrafted) SAN in the styrene/acrylonitrile graft polymer is in the range from 200,000 to 400,000 as determined by gel permeation chromatography [GPC] using ASTM Method D 3536-76 modified in that 4 columns in series using micro Styragel (Waters Assoc.) packing are used with a nominal exclusion limit of 500 A units, 1,000 A units, 10,000 A units and 100,000 A units. The detector is an ultraviolet light detector set at wavelength 254 nm. The test samples are prepared at a concentration of 0.25% weight of polymer in tetrahydrofuran. The sample injection size is 0.2 ml and a flow rate of 2 ml/min. at ambient temperature is used.

The grafted polybutadiene has an average particle size in the range of from 0.1 to 0.25 micron measured as a weight average particle size diameter with centrifugal photosedimentometer (CPSM) by the published procedure of Graves, M. J. et al "*Size Analysis of Subsieve Powders Using a Centrifugal Photosedimentometer*, British Chemical Engineering 9:742–744 (1964). A Model 3000 Particle Size Analyzer from Martin Sweets Co., 3131 W. Market St., Louisville, KY is used.

ABS-2—prepared by the graft suspension polymerization of styrene and acrylonitrile in a weight ratio of 72:28 in the presence of polybutadiene. ABS-2 contains 14% by weight of polybutadiene. The weight average molecular weight determined by GPC of the free SAN in the styrene/acrylonitrile graft polymer is in the range from 70,000 to 100,000 and the grafted polybutadiene has an average particle size in the range of from 0.6 to 1.6 microns by CPSM.

S/MA—a copolymer prepared by polymerizing a monomer mixture of styrene and maleic anhydride to produce a composition in which the monomers are in the weight ratio of 76.9/23.1.

S/MA/MM—a terpolymer prepared by polymerizing a monomer mixture of styrene, maleic anhydride and methyl methacrylate to produce a composition in which the monomers are in the weight ratio indicated.

S/MA/AN—a terpolymer prepared by polymerizing a monomer mixture of styrene, maleic anhydride and acrylonitrile to produce a composition in which the monomers are in the weight ratios indicated.

PC—a bisphenol A homopolycarbonate sold by Mobay Chemical Company under the tradename Merlon M50.

Glycolube TS—a glycerol tristearate plasticizer, available from Glyco.

Goodrite 3114—an alkylated phenol anti-oxidant available from Goodrich.

SAMPLE PREPARATION AND TEST METHODS

The components used in the working examples are compounded in a Banbury mixer at 180° to 250° C. The resulting blends are injection molded on an Arburg Molding Machine at 220° to 270° C. and 3.44 to 13.8 MPa. The molded samples are subjected to the following tests:

VICAT Softening Point (ASTM-D-1525-76-Rate B) a one (1) kg test using a heat rate of 120° C. per hour with results given in °C.;

Izod Impact (ASTM D-256-56) with results given in Joules/Meter J/M, sample sizes 1.27×1.27 cm, 1.27×0.64 cm, and 1.27×0.32 cm; and Multiaxial Inverted Dart Impact (IDI)—a modification of the test as described in Society of Plastics Engineers National Technical Conference "*Plastics in Surface Transportation* Nov. 12–14, 1974 Detroit, Mich. page 238. In the modified test, instead of the dart being attached to the slider and striking the sample, the sample holder is attached to the slider and strikes the instrumented dart. The rotary potentiometer is not used. The instrumented dart used is 1.27 cm in diameter, and the sample strikes the instrumented dart at a velocity of 111.76 m/min. The samples are injection molded into 7.62 cm×10.16 cm×0.254 cm and then are cut into 3.81 cm×5.08 cm×0.254 cm pieces for testing. Results are given in Joules (J).

The energy to maximum is the energy needed to achieve the yielding of a ductile sample. The energy to failure represents the energy necessary to cause a failure of a sample. The test is run at 23° C. and −20° C. to determine the effect of temperature on performance of the polymer. The difference (Δ) between the energy to fail and the energy to maximum indicates the ductility of the sample and the difference increases with ductility.

TABLE I

| SMA TERPOLYMER EFFECTS ON SMA/ABS/PC POLYBLENDS | | | | | | | |
|---|---|---|---|---|---|---|---|
| | | C-1 | I-1 | I-2 | I-3 | I-4 | C-2 | C-3 |
| SMA Type | MA | 23.1 | 25.2 | 22.7 | 21.3 | 21.7 | 20.5 | 19.7 |
| | MMA | 0 | 6.3 | 10.5 | 17.9 | 22.9 | 0 | 0 |
| | AN | 0 | 0 | 0 | 0 | 0 | 7.0 | 10.7 |
| IZOD Impact Sample Size | | | | | | | | |
| 1.27 × 1.27 cm | | 157 | 149 | 229 | 284 | 326 | 251 | 306 |
| 1.27 × 0.64 cm | | 478 | 397 | 582 | 702 | 719 | 587 | 506 |
| 1.27 × 0.32 cm | | 585 | 777 | 1247 | 1489 | 928 | 1146 | 757 |
| IDI fail (23° C.) | | 14.4 | 31.4 | 34.9 | 37.2 | 35.0 | 40.9 | 43.3 |
| max | | 11.6 | 25.1 | 27.3 | 28.5 | 26.8 | 29.5 | 32.2 |
| Δ | | 2.8 | 6.3 | 7.6 | 8.7 | 8.2 | 11.4 | 11.1 |
| (−20° C.) | | | | | | | | |
| fail | | 4.97 | 15.1 | 16.3 | 13.1 | 15.4 | 29.0 | 34.2 |
| max | | 4.86 | 14.7 | 16.2 | 13.0 | 14.5 | 24.7 | 29.2 |
| Δ | | 0.11 | 0.4 | 0.1 | 0.1 | 0.9 | 4.3 | 5.0 |
| Vicat | | 132.9 | 134.8 | 134.3 | 133.8 | 132.4 | 133.8 | 134.2 |

WORKING EXAMPLES AND TEST RESULTS

In Controls C-1 to C-3 and Examples I-1 to I-4, various polyblends are prepared and tested and the results tabulated in Table 1. Control C-1 is included for comparison purposes. Controls C-2 and C-3 show the effect of using AN as a termonomer in the SMA. The polyblend formulation consists of 40% by weight PC, 30% by weight of the SMA polymer, 22.6% by weight ABS-1, 7.4% by weight ABS-2. All examples are prepared using 0.3% by weight Goodrite 3114 and 2.5% by weight Glycolube TS based on the total weight of polymeric components (A), (B) and (C).

CONTROLS C-1 to C-3 AND EXAMPLES I-1 to I-4

Control Examples C-1 to C-3 and Examples I-1 to I-4 are tabulated in Table 1. Control example C-1 is a SMA copolymer (with no termonomer), ABS and PC polyblend. Examples I-1 to I-4 are made with SMAMMA terpolymer with MMA present from 6.3 wt % to 22.9 wt % of the terpolymer. Comparing C-1 to I-1, one can see that the Izod for the 1.27×1.27 cm and 1.27×0.64 cm sample decreases, while the Izod for the 1.27×0.32 cm sample increases. The IDI at 23° C. values, however, more than double, and the IDI at −20° C. values more than triple. Therefore, an addition of 6.3 wt % in the terpolymer (less than 2% methyl methacrylate in the total polyblend) brings a remarkable increase in impact properties.

The improvement in Izod properties is even better illustrated by comparing Example I-2 to Control Example C-1. The Izod values for each sample size show a marked increase. Likewise, the IDI values of Example I-2 are dramatically higher than those of Control Example C-1. Example I-2 also shows a further increase in impact properties over Example I-1. The Vicat of Example I-2 is about the same as that of I-1, an improvement over C-1.

The Izod values for the 1.27×1.27 cm and the 1.27×0.64 cm samples increase with increasing MMA, with an optimum not observed in the range tested. For the 1.27×0.32 cm sample, an optimum is observed at 17.9 wt % MMA (Example I-3). In the IDI values at −20° C., an optimum is observed at 10.5 wt % MMA (Example I-2) with an unexplained dip at 17.9 wt % MMA (Example I-3).

The Vicat varied only about 2° C. over the samples tested with an optimum value at 6.3 wt % MMA.

Control examples C-2 and C-3 illustrate the use of AN as an SMA termonomer. Comparing control examples C-2 to C-1, it can be seen that all the performance values improve, with a marked improvement of 200 to 500% in IDI values.

We claim:

1. A polyblend comprising:
   A. from 5 to 70% by weight of a terpolymer consisting of a vinylaromatic monomer and an unsaturated dicarboxylic acid anhydride monomer and a termonomer selected from the group consisting of $C_1$ to $C_3$ alkyl acrylates and methacrylates wherein the relative amounts of weight of the monomers in the terpolymer are 50 to 84% of the vinylaromatic monomer, 15 to 35% of the dicarboxylic acid anhydride and 1 to 25% of the termonomer; and
   B. from 5 to 70% by weight of a graft polymer of from 20 to 40 parts by weight of a monomer selected from the group consisting of acrylonitrile and methacrylonitrile and 80 to 60 parts by weight of a vinyl aromatic monomer the polymer being grafted onto a substrate rubber having a glass transition temperature below 0° C. wherein the monomers are polymerized in the presence of and grafted onto the substrate rubber, wherein the weight percent of the rubber is in the range from 5 to 60% by weight based on the weight of the composition; and
   C. from 5 to 70% of bisphenol A homopolycarbonate; wherein the weight percent for Components A, B, and C is based on the total amount of Components (A), (B), and (C) in the polyblend.

2. A polyblend as in claim 1 wherein the $C_1$ to $C_3$ alkyl acrylates and methacrylates are in the range of 5 to 20% by weight of the terpolymer and the weight ratio of the terpolymer of Component A to the graft Polymer of Component B is in the range from 20:80 to 80:20.

3. A polyblend as in claim 1 wherein the $C_1$ to $C_3$ alkyl acrylates and methacrylates are in range of 10 to 20% by weight of the terpolymer and the weight ratio of the terpolymer of Component A to the graft polymer of Component B is in the range from 20:80 to 80:20.

4. A polyblend as in claim 1 wherein the $C_1$ to $C_3$ alkyl acrylates and methacrylates are in the range of 10 to 20% by weight of the terpolymer and the weight ratio of the terpolymer of Component A to the graft polymer of Component B is in the range from 30:70 to 70:30.

5. A polyblend as in claim 1 wherein the $C_1$ to $C_3$ alkyl methacrylate is methyl methacrylate.

6. A polyblend as in claim 1 wherein Component A is a styrene maleic anhydride methyl methacrylate terpolymer.

7. A polyblend as in claim 1 wherein the graft-polymer of Component B is butadiene rubber substrate grafted with styrene and acrylonitrile monomers.

8. A polyblend comprising:
   A. from 5 to 70% by weight of a styrene maleic anhydride polymer consisting of 50 to 84% by weight of styrene, 15 to 35% by weight of maleic anhydride and 1 to 25% by weight of a methyl methacrylate termonomer; and
   B. from 5 to 70% by weight of a graft polymer composition comprising a graft polymer of from 20 to 40 parts by weight of acrylonitrile and 80 to 60 parts by weight of styrene, the polymer being grafted onto a butadiene rubber having a glass transition temperature below 0° C. wherein the monomers are polymerized in the presence of and grafted onto the substrate rubber, wherein the weight Percent of the rubber is in the range from 5 to 60% by weight based on the weight of the composition; and
   C. from 5 to 70% of bisphenol A homopolycarbonate; and wherein the weight ratio of the styrene maleic anhydride polymer to the graft polymer composition is in the range of 80:20 to 20:80; and wherein the weight percent for Components (A), (B), and (C) is based on the total amount of Components (A), (B), and (C) in the polyblend.

9. A polyblend as in claim 8 wherein the methyl methaacrylate is present from 10 to 20% by weight of the terpolymer and the weight ratio of the polymer of styrene maleic anhydride methyl methacrylate terpolymer to the graft polymer composition is in the range from 30:70 to 70:30.

10. Molded and extruded articles prepared from a polyblend comprising:
   A. from 5 to 70% by weight of a terpolymer consisting of a vinylaromatic monomer and an unsaturated dicarboxylic acid anhydride monomer and a termonomer, selected from the group consisting of $C_1$ to $C_3$ alkyl acrylates and methacrylates, wherein the relative amounts by weight of the monomers in the terpolymer are 50 to 84% of the vinylaromatic monomers, 15 to 35% of the dicarboylic acid anhydride and 1 to 25% of the termonomer; and
   B. from 5 to 70% by weight of a graft polymer of from 20 to 40 parts by weight of a monomer selected from the group consisting of acrylonitrile and methacrylonitrile and 80 to 60 parts by weight of a vinyl aromatic monomer, the polymer being grafted onto a substrate rubber having a glass transition temperature below 0° C. wherein the monomers are polymerized in the presence of and grafted onto the substrate rubber, wherein the weight percent of the rubber is in the range from 5 to 60% by weight based on the weight of the composition; and
   C. from 5 to 70% of bisphenol homopolycarbonate; and wherein the weight percent for Components (A), (B), and (C) is based on the total amount of Components (A), (B), and (C) in the polyblend.

* * * * *